2,956,895
CELLULOSE ESTER COMPOSITIONS

Martin Salo and Gerard J. Clarke, Rochester, N.Y., assignors to Eastman Kodak Company, Rochester, N.Y., a corporation of New Jersey No Drawing. Filed June 27, 1957, Ser. No. 668,317

4 Claims. (Cl. 106—177)

This invention relates to water soluble cellulose ester compositions which may be rendered water insoluble by means of catalytic action or an elevated temperature.

It is known in the art that cellulose acetates when hydrolyzed to a sufficient extent become water soluble and solutions thereof in water may be employed for various purposes as shown, for instance, in U.S. Patent No. 2,129,052. There is the disadvantage, however, in using cellulose esters of this type that the coatings or other products prepared therewith do not have any appreciable resistance to water. For instance, water soluble cellulose acetate is useful for water soluble coatings for photographic films or water soluble paper coatings. However for the application of coatings of cellulose acetate which are resistant to water, it has heretofore been necessary to apply the cellulose acetate from its solution in a volatile solvent which upon evaporation leaves a film or coating of water insoluble cellulose acetate.

One object of our invention is to provide a means of using aqueous solutions of cellulose acetate for applying coatings which coatings may then be rendered water insoluble. Another object of our invention is to provide a means of insolubilizing water soluble cellulose acetate. A further object of our invention is to provide cellulose ester compositions which can be applied from water solution to form coatings which are water-resistant after the solvent has been removed therefrom. Other objects of our invention will appear herein.

We have found that aqueous solutions of water soluble cellulose acetates may be applied to surfaces as coatings thereon and those coatings may be rendered insoluble by the application of heat or by catalytic action when a small percentage of dimethylol urea has been incorporated in the cellulose acetate solution employed in the coating procedure. Compositions in accordance with our invention may, for instance, be employed in the photographic art as carriers for light sensitive materials pigments or dyes or in other arts as carriers for pigments or bulk materials or as binders for cellulose fibers such as, for instance, in the manufacture of paper cardboard, adhesive and molding compositions. Compositions in accordance with our invention may be employed as the binder in the manufacture of plastic wood compositions and after application and curing will exhibit resistance to the effects of moisture even though a water base composition had been employed.

Water soluble cellulose acetate results when cellulose acetate has been hydrolyzed down to an acetyl content within the range of 12–19% acetyl. A method of making water soluble cellulose acetate is described in detail in U.S. Patent No. 2,129,052 of Charles R. Fordyce. It is desirable that substantially all of the acyl content of the water-soluble cellulose ester be acetyl although it is, of course, recognized that sometimes reagents may be employed in its preparation which contain small proportions of other acids particularly lower fatty acids of 3 or 4 carbon atoms. Esters of this general type will be referred to herein as cellulose acetates. To obtain good water solubility, any acyl present in the ester other than acetyl should be somewhat limited, such as to not more than 5% of the total acyl.

The compositions in accordance with our invention are prepared by adding to the cellulose ester while in aqueous solution a small amount of dimethylol urea. It has been found that as little as 5% of dimethylol urea based on the weight of the cellulose acetate has caused insolubilization thereof in procedures in accordance with our invention although larger proportions of that modifying material such as up to 15% or even more is compatible with the conditions of operation employed. The following illustrates a method of preparing dimethylol urea such as would be suitable for use in an operation as described:

EXAMPLE 1

129 grams of urea was dissolved in 367 grams of 37% formaldehyde that had been neutralized to a phenolphthalein end-point with .1 normal sodium hydroxide buffered with .5 g. of sodium acetate. The mass was kept at room temperature for 170 hours and the product formed a precipitate. The dimethylol urea so formed was isolated by filtering off the liquid from the product obtained. After washing with 95% ethanol the product was spread and allowed to dry at room temperature.

The dimethylol urea has the effect when incorporated therein of insolubilizing water soluble cellulose acetate after it has been formed into a coating or other product either by subjecting the coating to an elevated temperature within the range of 120–400° F. or by including a catalyst in the mass and allowing to stand at ordinary temperature. The compounds which have been found to be most useful as catalysts for the insolubilizing of water soluble cellulose acetates in accordance with our invention are the lower alkyl phosphates such as diethyl acid phosphate and dibutyl acid phosphate. With the use of an elevated temperature in the absence of catalysts ordinarily the curing takes place in ½ to 1 hour.

The following illustrates the preparation of water insoluble coatings from compositions in accordance with our invention.

EXAMPLE 2

Various proportions of a 10% aqueous (water) solution of 17% acetyl cellulose acetate were mixed with a 10% aqueous solution of dimethylol urea with and without dibutyl phosphate in an amount equal to 10% of the dimethylol urea. The solutions were coated out onto glass plates and their behaviors were observed. The following table gives the results which were obtained:

*Influence of dimethylol urea on the solution and film properties of 17% acetyl cellulose acetate*

| Percent Cellulose Acetate | Percent Dimethylol Urea | Percent Dibutyl Phosphate | Percent Distilled Water | Appearance of Solution | Curing | Appearance of Coating | Solubility of coating in distilled water after curing |
|---|---|---|---|---|---|---|---|
| 9.5 | .5 | 0 | 90 | Clear | 16 hrs. R.T. | Clear | Soluble. |
| 9.5 | .5 | 0.05 | 89.95 | ...do | ......do | ......do | Insoluble. |
| 9.95 | 0 | 0.40 | 89.65 | ...do | ......do | Blush | Soluble. |
| 9.0 | 1.0 | 0 | 90 | ...do | ......do | Clear | Do. |
| 9.0 | 1.0 | 0 | 90 | ...do | ½ hr. 80° C | ......do | Insoluble. |
| 9.0 | 1.0 | 0.10 | 89.9 | ...do | 16 hrs. R.T. | ......do | Do. |
| 8.5 | 1.5 | 0 | 90.0 | ...do | ......do | ......do | Soluble. |
| 8.5 | 1.5 | 0.15 | 89.85 | ...do | ......do | Sl. haze | Insoluble. |
| 8.0 | 2.0 | 0 | 90.0 | ...do | ......do | Clear | Soluble. |
| 8.0 | 2.0 | 0.20 | 89.80 | ...do | ......do | Sl. haze | Insoluble. |

In the compositions of cellulose acetate containing dimethylolurea, the coating prepared therefrom which contained catalyst became insoluble upon standing at room temperature. Without catalyst heating of the coatings was necessary to obtain insolubilization. The coatings that did not contain dimethylol urea did not go to the insoluble form either at normal or elevated temperature, whether or not catalyst was present.

We claim:
1. A coating composition adapted to be used for the production of water resistant coatings which essentially consists of an aqueous solution of cellulose acetate having an acetyl content of 12–19% containing 5–20% of dimethylol urea based on the weight of the cellulose acetate and a di alkyl acid phosphate catalyst.

2. A method of applying water insoluble coatings which comprises applying to a surface a layer of an aqueous solution of cellulose acetate having an acetyl content of 12–19% which solution contains 5–20% of dimethylol urea and a di alkyl acid phosphate and allowing the coating to stand for a time sufficient to convert the coating into water insoluble form.

3. A coating composition adapted to be used for the production of water resistant coatings essentially consisting of an aqueous solution of cellulose acetate having an acetyl content of 12–19%, 5–20%, based on the weight of the cellulose acetate, of dimethylol urea and diethyl acid phosphate catalyst.

4. A coating composition adapted to be used for the production of water resistant coatings essentially consisting of an aqueous solution of cellulose acetate having an acetyl content of 12–19%, 5–20%, based on the weight of the cellulose acetate, of dimethylol urea and dibutyl acid phosphate catalyst.

References Cited in the file of this patent

UNITED STATES PATENTS

| 1,721,742 | Nash | July 23, 1929 |
| 2,129,052 | Fordyce | Sept. 6, 1938 |
| 2,300,976 | Scheuermann | Nov. 3, 1942 |

FOREIGN PATENTS

| 588,426 | Great Britain | May 21, 1947 |

OTHER REFERENCES

Ellis: "The Chemistry of Synthetic Resins," vol. I (1935), pp. 622 and 630–638.

Ott et al.: "High Polymers," vol. V (Cellulose), second edition, Part II, 1954, page 936.